(12) United States Patent
Fiederle

(10) Patent No.: US 11,559,929 B2
(45) Date of Patent: Jan. 24, 2023

(54) INJECTION-MOULDING MACHINE WITH AN INDEX SHAFT HAVING A CHANNEL FOR A FLUID

(71) Applicant: KRAUSSMAFFEI TECHNOLOGIES GMBH, Munich (DE)

(72) Inventor: Ralf Fiederle, Eglofs (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/043,849

(22) PCT Filed: Feb. 14, 2019

(86) PCT No.: PCT/EP2019/053653
§ 371 (c)(1),
(2) Date: Sep. 30, 2020

(87) PCT Pub. No.: WO2019/206486
PCT Pub. Date: Oct. 31, 2019

(65) Prior Publication Data
US 2021/0213655 A1    Jul. 15, 2021

(30) Foreign Application Priority Data

Apr. 27, 2018 (DE) ..................... 10 2018 110 223.2

(51) Int. Cl.
*B29C 45/04* (2006.01)
*B29C 45/17* (2006.01)
*B29C 45/06* (2006.01)

(52) U.S. Cl.
CPC ........ *B29C 45/045* (2013.01); *B29C 45/1775* (2013.01); *B29C 45/06* (2013.01);
(Continued)

(58) Field of Classification Search
CPC .................... B29C 45/045; B29C 45/1775
See application file for complete search history.

(56) References Cited

U.S. PATENT DOCUMENTS 2,407,503 A * 9/1946 Magerkurth .......... B29C 48/865
425/207
3,883,047 A * 5/1975 Hofer .................. B29C 45/5008
222/413
(Continued)

FOREIGN PATENT DOCUMENTS

DE    202015101432 U1    4/2015
EP       1688232 A1      8/2006
(Continued)

OTHER PUBLICATIONS

Machine translation WO 2006/018364 (Year: 2006).*
(Continued)

*Primary Examiner* — Francisco W Tschen
*Assistant Examiner* — Wayne K. Swier
(74) *Attorney, Agent, or Firm* — Pearne & Gordon LLP

(57) ABSTRACT

An injection-moulding machine, having a first platen, which is designed for carrying a first mould half of an injection mould, a second platen, which is designed for carrying a second mould half of the injection mould in such a way that in a closed state of the injection mould the first mould half and the second mould half delimit at least one cavity of the injection mould, and having an index shaft, which is mounted rotatably and axially adjustably on the injection-moulding machine outside the injection mould, is rotationally driven by of a motor of the injection-moulding machine arranged outside the injection mould and has an end portion which protrudes into the injection mould in the installed position of the injection mould in the injection-moulding machine, is designed for fastening on the index shaft an index plate to be arranged within the injection mould and has at least one channel which is designed to feed a fluid to the index plate or to remove a fluid from the index plate, wherein by means of the index shaft, driven by the motor, the index plate is automatically adjustable between a first
(Continued)

plate position of the index plate and at least one second plate position of the index plate, and wherein the motor has a hollow motor shaft, through which the fluid is passed.

12 Claims, 6 Drawing Sheets

(52) U.S. Cl.
CPC ............... *B29C 2045/1785* (2013.01); *B29C 2045/1792* (2013.01)

(56) References Cited

U.S. PATENT DOCUMENTS

| | | | | |
|---|---|---|---|---|
| 6,613,262 | B1* | 9/2003 | Arend | B29C 45/6728 |
| | | | | 264/328.8 |
| 2004/0052894 | A1 | 3/2004 | Rudolph et al. | |
| 2006/0172036 | A1* | 8/2006 | Rahnhofer | B29C 45/162 |
| | | | | 425/556 |
| 2011/0049762 | A1* | 3/2011 | Kariya | B29C 45/73 |
| | | | | 264/328.16 |
| 2012/0275884 | A1* | 11/2012 | Beck | B65H 5/16 |
| | | | | 414/222.01 |
| 2018/0290359 | A1* | 10/2018 | Berlin | B29C 45/6707 |

FOREIGN PATENT DOCUMENTS

| | | | | |
|---|---|---|---|---|
| WO | 02057064 | A1 | 7/2002 | |
| WO | 2006018364 | A1 | 2/2006 | |
| WO | WO-2006018364 | A1 * | 2/2006 | ......... B29C 33/0083 |

OTHER PUBLICATIONS

International Search Report for PCT/EP2019/053653 dated May 23, 2019.
Written Opinion for PCT/EP2019/053653 dated May 23, 2019.

* cited by examiner

INJECTION-MOULDING MACHINE WITH AN INDEX SHAFT HAVING A CHANNEL FOR A FLUID

CROSS-REFERENCE TO RELATED APPLICATIONS

This is a National Stage application of PCT international application PCT/EP2019/053653 filed on Feb. 14, 2019, which claims the priority of European Patent Application No. 10 2018 110 223.2, filed Apr. 27, 2018, which are incorporated herein by reference in their entireties.

FIELD OF THE INVENTION

The invention relates to an injection-moulding machine, having a first platen, which is designed for carrying a first mould half of an injection mould, a second platen, which is designed for carrying a second mould half of the injection mould in such a way that in a closed state of the injection mould the first mould half and the second mould half delimit at least one cavity of the injection mould, and having an index shaft, which is mounted rotatably and axially adjustably on the injection-moulding machine outside the injection mould, is rotationally driven by means of a motor of the injection-moulding machine arranged outside the injection mould and has an end portion which protrudes into the cavity of the injection mould in the installed position of the injection mould, which end portion is designed for fastening on the index shaft an index plate to be arranged within the cavity, and wherein by means of the index shaft, driven by the motor, the index plate is automatically adjustable between a first plate position of the index plate and at least one second plate position of the index plate.

BACKGROUND OF THE INVENTION

From DE 20 2015 101 432 U1 for example an injection-moulding machine is known with a fixed platen for receiving a first part of an injection mould, with a movable platen for receiving a second part of an injection mould, and with two further plates which are arranged outside the installation space of the injection mould behind one of the platens, in particular behind the movable platen, wherein the first further plate is an ejector plate, which is provided for ejecting moulded parts out of the injection mould and which is designed for receiving ejector rods or is provided with ejector rods, wherein the second further plate is an additional plate on which a rotary drive is provided, wherein the rotary drive is in operative connection with a rotary shaft, which is connectable or connected with a rotatable part of the injection mould, in particular with an index plate, and wherein the ejector plate and the additional plate are able to be moved independently of each other in the longitudinal direction of the machine. In order to be able to feed media, in particular fluid media, to the rotatable part of the injection mould, in particular the index plate, optionally there a rotary feed-through or a hose feed-through can be provided. In the case of such a hose feed-through, the hoses for the media supply are connected directly to the rotary shaft, more precisely to the channels, running in the rotary shaft, for the media supply. The rotary shaft can therefore only be rotated forward and back to a limited extent. A spinning or cycling through of the rotary shaft is not possible with such a hose feed-through.

The object of the invention is to create an injection-moulding machine in which fluids can be directed over an index shaft in a simple and reliable manner to an index plate which is able to be repositioned by the index shaft.

BRIEF SUMMARY OF THE INVENTION

The problem is solved by an injection-moulding machine, having a first platen, which is designed for carrying a first mould half of an injection mould, a second platen, which is designed for carrying a second mould half of the injection mould in such a way that in a closed state of the injection mould the first mould half and the second mould half delimit at least one cavity of the injection mould, and having an index shaft, which is mounted rotatably and axially adjustably on the injection-moulding machine outside the injection mould, is rotationally driven by means of a motor of the injection-moulding machine arranged outside the injection mould and has an end portion which protrudes into the injection mould in the installed position of the injection mould in the injection-moulding machine, is designed for fastening on the index shaft an index plate to be arranged within the injection mould and has at least one channel which is designed to feed a fluid to the index plate or to remove a fluid from the index plate, wherein by means of the index shaft, driven by the motor, the index plate is automatically adjustable between a first plate position of the index plate and at least one second plate position of the index plate, and wherein the motor has a hollow motor shaft, through which the fluid is passed.

In addition to the use of at least one channel of the index shaft as a flow channel for fluids or as a tunnel for a fluid line, the channel or the tunnel can also be used in order for example to pass through electric lines or electric cables. Generally, the channel in the index shaft can be configured as a bore.

In a first basic variant embodiment, the channel can be configured as a flow channel in which the fluid is conveyed between an end portion of the index shaft facing away from the index plate and the end portion of the index shaft protruding into the injection mould. In order to enable this, the index shaft can have for example at its end portion facing away from the index plate a connection piece which is fluidically connected with the flow channel and to which a fluid feed line is connected. The fluid feed line can be connected to the index shaft at an end portion of the index shaft, facing away from the index plate, in a manner leading radially away, and laterally to the index shaft can be directed into an energy chain of the injection-moulding machine rolling around the rotation axis of the index shaft. In this embodiment, the connection piece can be arranged on an outer wall of the index shaft. Alternatively, the fluid feed line can be axially connected to the index shaft at a front end of the index shaft facing away from the index plate and outside of the index shaft guided substantially about a 90 degree bend away from the rotation axis of the index shaft and subsequently directed into an energy chain of the injection-moulding machine rolling around the rotation axis of the index shaft. In this embodiment, the connection piece can be arranged at the front end of the index shaft facing away from the index plate.

In a second basic variant embodiment, the channel can be configured as a tunnel in which a fluid line or a portion of a fluid line is laid, wherein the fluid is conveyed within the fluid line or within the portion of the fluid line between an end portion of the index shaft facing away from the index plate and the end portion of the index shaft protruding into the injection mould.

By the motor, which is configured for the rotating of the index shaft, having a hollow motor shaft, through which the fluid line is directed, the fluid line can be passed in an axial direction to the rotational movement of the index shaft through the motor and at the same time can be passed through the channel of the index shaft. For example, through an energy chain which is put up in a rotationally movable manner, situated at the end of the index shaft, it is not necessary to introduce the fluid line into the index shaft for example via a rotary feed-through. The structure of the index shaft can thereby be considerably simplified. Complex, expensive and maintenance-intensive rotary feed-throughs can be omitted. As the motor has a hollow motor shaft, the motor can be arranged coaxially to the index shaft or at least flush with the rotation axis of the index shaft. Such an arrangement is particularly advantageous, because the motor shaft in this respect can continue directly into the hollow index shaft. Owing to the hollow motor shaft of the motor, the fluid line can be fed axially at the front side of the index shaft. An axial feeding of the fluid line is particularly favourable.

At the outlet of the index shaft, the fluid line can then be redirected in a simple manner into an energy chain. The energy chain serves for the protection and the directing of the portion of the fluid line exiting from the index shaft. The energy chain can also be designed as an energy guiding chain. An energy chain or energy guiding chain can generally consist of several individual members which are connected with one another in an articulated manner and in this respect forms a chain of a plurality of individual members. Owing to the articulated connection of the individual single members, the entire chain can be directed and moved with minimum application of force along an arc line. The individual members form here an inner guide channel, into which the fluid line can be inserted. The individual members delimit the fluid line from the exterior and form a protection for the fluid line against damage from the exterior. The energy chain can guarantee here a smallest permissible bending radius for the fluid line and at the same time can reduce a wear of the fluid line. The energy chain can be mounted on the injection-moulding machine in such a way that the fluid line can follow the rotation of the index shaft with minimal bending load and minimal wear. If applicable, the fluid line can be fixed within the energy chain, for example clamped, so that hereby an optional strain relief can be formed.

The fluid line can be configured in a single core or multicore manner. For example, a first individual line can be provided within the channel of the index shaft for feeding a fluid to the index plate and a second individual line can be provided within the channel of the index shaft for discharging a fluid to the index plate. At the same time for example a first individual line can be provided within the energy chain for feeding a fluid to the index plate and a second individual line can be provided within the energy chain for discharging a fluid to the index plate.

In this respect, the fluid line can be configured as a one-piece fluid line, i.e. free of connection coupling points. The fluid line can be configured in particular in one piece leading away from the energy chain into the index shaft free of connection coupling points. Alternatively, the fluid line can be formed from several sections of fluid lines or respectively as several portions of fluid lines, in particular separable from one another and able to be joined together again.

The fluid line can be formed for example from one or more hoses. The hoses here generally have a circular-cylindrical outer wall and are configured so as to be hollow internally, so that inside the circular-cylindrical outer wall of the hose the fluid can be transported, in particular pumped. The fluid which is directed in the fluid line or respectively in the hose can be a cooling fluid or a heating fluid. The fluid can be, for example, an oil or water. If applicable, a gas, such as for example compressed air or nitrogen can also be directed as fluid through the fluid line. As owing to the hollow motor shaft a hose line which is in this respect simple and completely tight can be directed through the index shaft, a special preparation or a cleaning or respectively filtering of the fluid is omitted. As the fluid comes into direct contact neither with the hollow motor shaft nor with the index shaft, measures for corrosion resistance can also be omitted.

In all variant embodiments the motor can be configured as a gearless torque motor. A torque motor is generally understood to mean a motor which can generate a high torque at low rotation rates, i.e. few revolutions per minute (for example 10 to 300). Here, also, a high positioning accuracy is achieved. In particular, a torque motor is understood to mean a gearless direct drive. The torque motor can be in particular a multi-pole brushless direct current motor or a switched reluctance motor. The motor, in particular the torque motor, can preferably be configured as an internal rotor. The motor shaft is configured here as a hollow shaft. The index shaft is arranged in the free interior of the hollow shaft. The index shaft is coupled to the hollow shaft of the motor, in particular rigidly connected, so that the index shaft can be driven rotatably by the motor.

The motor and the index shaft can be arranged on the injection-moulding machine in such a way that the central axis of the hollow motor shaft and the central axis of the index shaft lie on a common rotation axis.

The hollow motor shaft and the index shaft having the channel can be in this respect either arranged abutting one another at the front side or arranged inserted coaxially into one another. By the motor and the index shaft being arranged on the injection-moulding machine in such a way that the central axis of the hollow motor shaft and the central axis of the index shaft lie on a common rotation axis, the channel portion within the hollow motor shaft can be flush with the channel of the index shaft, so that the fluid line can be directed through the motor and the index shaft in particular in a bending-free and kinking-free manner.

The hollow motor shaft can extend coaxially to the index shaft, and the index shaft can be directed here out of an end of the hollow motor shaft facing away from the index plate.

In this variant embodiment, the fluid line does not run directly in the hollow motor shaft, but rather only directly within the channel of the index shaft. The index shaft carrying the fluid line then extends entirely through the hollow motor shaft of the motor. In this respect, only the index shaft extends directly through the hollow motor shaft and the fluid line directly through the index shaft.

The fluid line which is directed through the channel of the index shaft can be directed radially out from the channel of the index shaft at an end portion of the index shaft facing away from the index plate, and can be directed laterally to the index shaft into an energy chain of the injection-moulding machine rolling around the rotation axis of the index shaft.

Alternatively, the fluid line which is directed through the channel of the index shaft can be directed out axially from the channel of the index shaft at a front end of the index shaft facing away from the index plate, and can be directed away from the rotation axis of the index shaft outside the index shaft at least substantially about a 90 degree bend, and can subsequently be directed into an energy chain of the injection-moulding machine rolling around the rotation axis of the index shaft.

In all embodiments, the injection-moulding machine can have an adjustably mounted ejector plate, which is arranged on a rear side of the first platen or of the second platen facing away from the injection mould, and which in turn has a rear side facing away from the injection mould, on which both the motor with its motor housing is secured, and also the index shaft is mounted rotatably by the motor and immovably relative to the ejector plate in axial direction.

The hollow motor shaft can have an inner profile, and the index shaft can have an outer profile, wherein the inner profile of the hollow motor shaft and the outer profile of the index shaft are coordinated with one another in such a way that the hollow motor shaft is coupled with the index shaft in a torque-proof manner.

The index shaft can be directed in a displaceable manner in axial direction relative to the hollow motor shaft.

The fluid line can be configured as a hose line extending in one piece through the hollow motor shaft of the motor and the channel of the index shaft up to the index plate.

The fluid line can be configured in a single core or multicore manner. For example, a first individual line can be provided within the channel of the index shaft for feeding a fluid to the index plate, and a second individual line can be provided within the channel of the index shaft for discharging a fluid to the index plate. At the same time, for example, a first individual line can be provided within the energy chain for feeding a fluid to the index plate, and a second individual line can be provided within the energy chain for discharging a fluid to the index plate.

In this respect, the fluid line can be configured as a one-piece fluid line, i.e. free of connection coupling points. The fluid line can be configured in particular in one piece leading away from the energy chain into the index shaft, free of connection coupling points.

The fluid line can be formed for example by one or more hoses. The hoses generally have here a circular-cylindrical outer wall and are configured so as to be hollow internally, so that within the circular-cylindrical outer wall of the hose the fluid can be transported, in particular pumped. The fluid which is directed in the fluid line or respectively in the hose can be a cooling fluid or a heating fluid. The fluid can be, for example, an oil or water. If applicable, a gas, such as for example compressed air or nitrogen, can also be directed as fluid through the fluid line. As owing to the hollow motor shaft an in this respect simple and completely tight hose line can be directed through the index shaft, a special preparation or a cleaning or respectively filtering of the fluid is omitted. As the fluid comes in direct contact neither with the hollow motor shaft nor with the index shaft, measures for corrosion protection can also be omitted.

BRIEF DESCRIPTION OF THE DRAWINGS

A practical example embodiment of the invention is explained further in the following description with reference to the enclosed figures. Practical features of this exemplary example embodiment can represent general features of the invention, independently of in which practical context they are mentioned, if applicable also regarded individually or in further combinations.

There are shown.

DESCRIPTION OF EXAMPLE EMBODIMENTS

Figure 1:
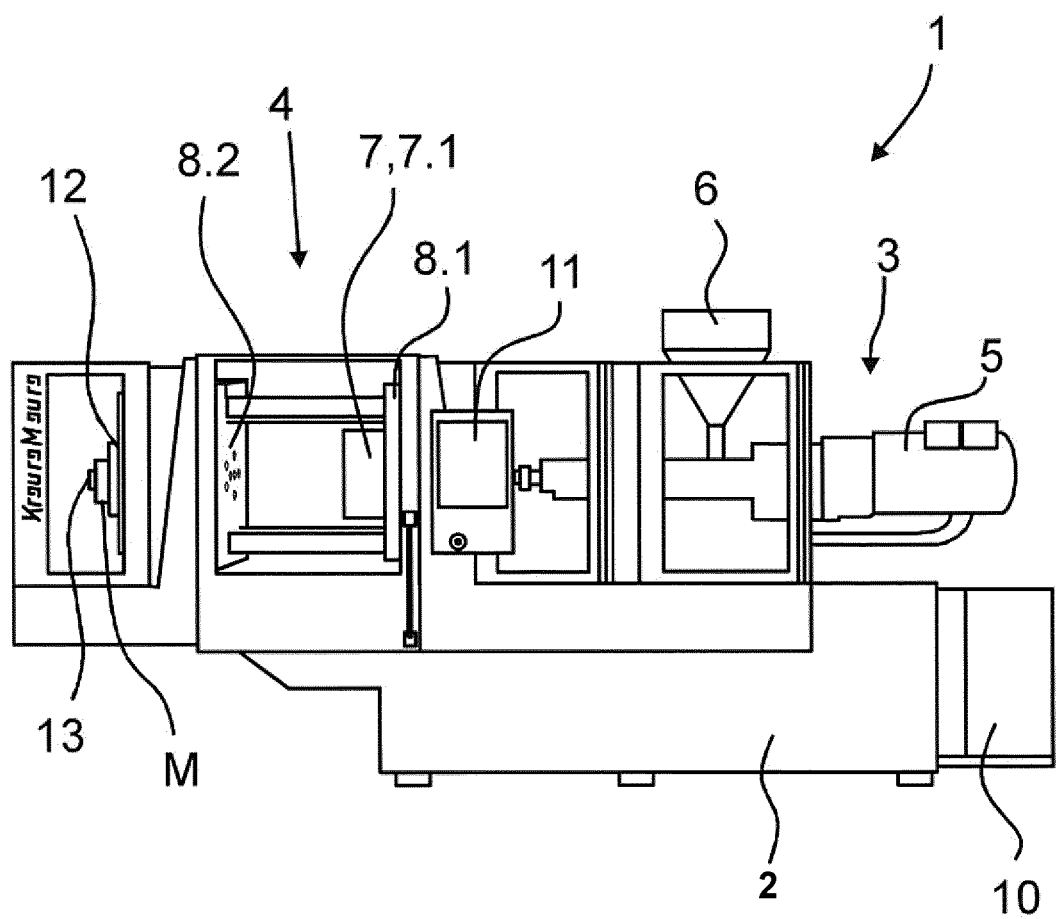
FIG. 1 a schematic illustration of an exemplary injection-moulding machine.

The exemplary injection-moulding machine 1 shown in FIG. 1 has a machine frame 2, on which an injection unit 3 and a clamping unit 4 are arranged. The injection unit 3 serves for the preparation of a plastic mass which is to be formed. In the case of the present example embodiment, the injection unit 3 has an extruder 5. The extruder 5 is configured to melt, mix and homogenize, if applicable degas, at least one intermediate plastic product, such as for example a plastic granulate. For this, or respectively for the feeding or for example the plastic granulate, the extruder 5 has a feed hopper 6.

At a front end of the injection unit 3 or respectively at a front end of the extruder 5, an injection nozzle is arranged, not illustrated in further detail, which is coupled to an injection mould 7. The injection mould 7 is arranged in the clamping unit 4 of the plastic injection-moulding machine 1, which is usually arranged on the machine frame 2 of the injection-moulding machine 1 and has a fixed platen 8.1 and a movable platen 8.2. The injection mould 7 comprises at least two mould halves 7.1 and 7.2, of which the first mould half 7.1 is fastened on the fixed platen 8.1, and the second mould half 7.2 (not illustrated, i.e. removed, in FIG. 1), is fastened on the movable platen 8.2, in such a way that with an opening of the clamping unit 4, i.e. with a moving apart of the fixed platen 8.1 and of the movable platen 8.2 at least one cavity 9 (FIG. 2) of the injection mould 7 is freed.

The injection-moulding machine 1 has accordingly several machine parts. Certain machine parts can be movably mounted and can be moved by means of a motor (M) or drive, in particular a hydraulic or electric motor or respectively a hydraulic or electric drive automatically or in a manually controlled manner in a manual operation. Thus, the clamping unit 4 represents an exemplary machine part which, controlled by a machine control 10 of the injection-moulding machine 1, according to a machine program running in the machine control 10, can be controlled, opened or closed automatically or manually in a manual operation for example by means of a user interface device 11 of the injection-moulding machine 1. The injection unit 3 represents another exemplary machine part which, controlled by the machine control 10 of the injection-moulding machine 1, can be operated, according to a machine program running in the machine control 10, automatically or in a manually controlled manner in a manual operation for example by means of the user interface device 11, for example by controlling or regulating the rotation speed of the extruder 5 or by controlling or regulating at least one heating device of the injection unit 3 which is not illustrated in further detail. The injection-moulding machine 1 comprises furthermore at least one ejector plate 12, which in the case of the present example embodiment is mounted in a linearly adjustable manner on the rear side of the movable platen 8.2. On the ejector plate 12 in addition an index shaft 13 is mounted, which is drivable by a motor M and on which an index plate 14 (FIG. 2) is fastened.

Figure 2:
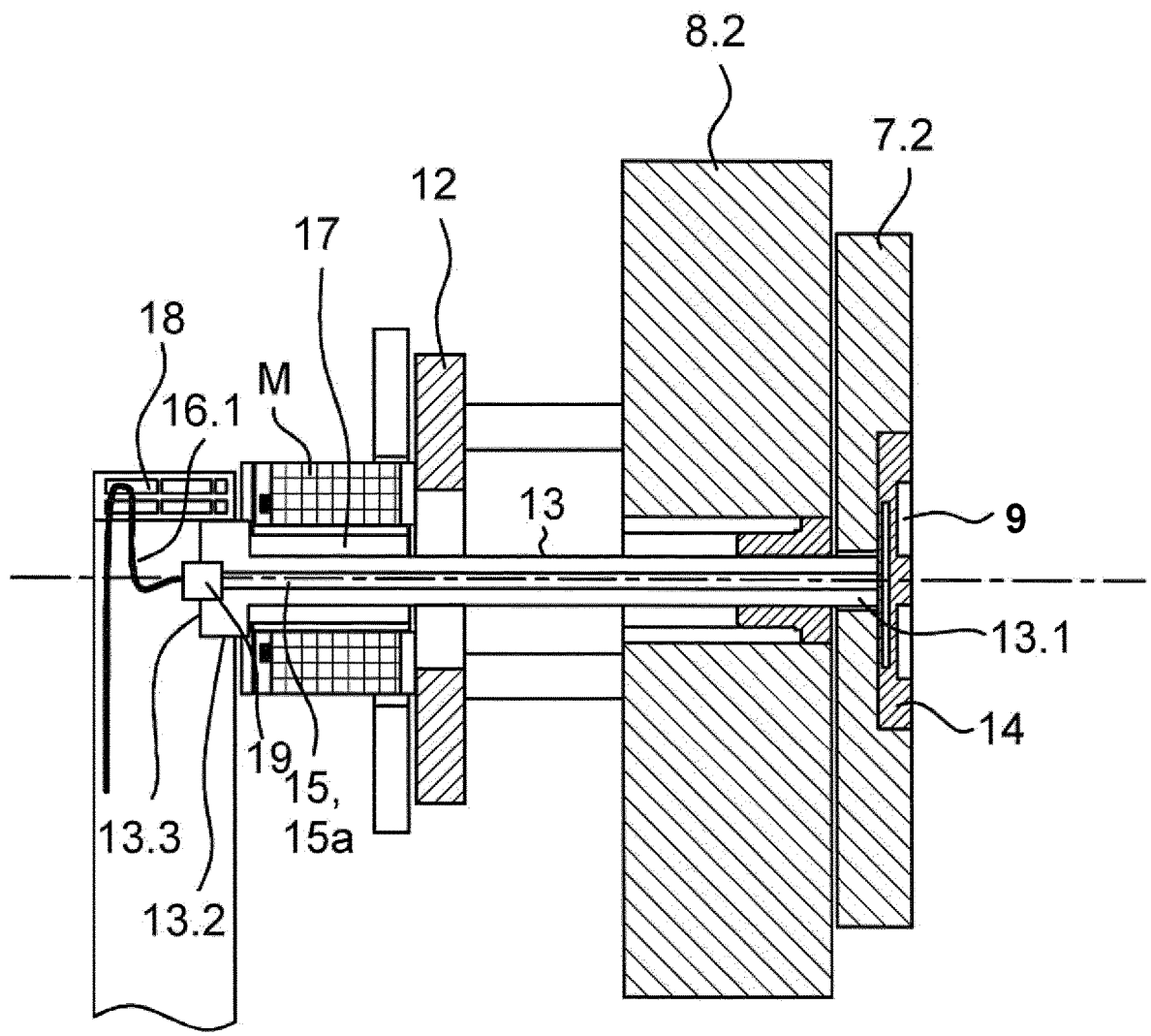
FIG. 2 a schematic sectional illustration through the motor and the index shaft in the rear region of a movable platen in the first variant embodiment with a flow channel, to which a fluid feed line is connected axially at the front side via a connection piece, FIG. 3 a schematic sectional illustration through the motor and the index shaft in the rear region of the movable platen in the first variant embodiment with a flow channel, to which a fluid feed line is connected radially via a connection piece, FIG. 4 a schematic sectional illustration through the motor and the index shaft in the rear region of the movable platen in the second variant embodiment with the index plate in a first plate position and a continuous fluid line directed out axially, FIG. 5 a schematic sectional illustration through the motor and the index shaft in the rear region of the movable platen with the index plate according to FIG. 4 in a second plate position, and FIG. 6 a schematic sectional illustration through the motor and the index shaft in the rear region of the movable platen in the second variant embodiment with a continuous fluid line directed out radially.

FIG. 2 shows the channel 15 as a flow channel 15*a* in which the fluid is conveyed between an end portion 13.2 of the index shaft 13, facing away from the index plate 14, and the end portion 13.1 of the index shaft 13 protruding into the injection mould 7. In this case, the index shaft 13 has at its end portion 13.2 facing away from the index plate 14 a connection piece 19, which is fluidically connected with the flow channel 15*a* and to which a fluid feed line 16.1 is connected. The fluid feed line 16.1 is connected axially to the index shaft 13 at a front end 13.3 of the index shaft 13, facing away from the index plate 13, and outside the index shaft 13 is directed away from the rotation axis of the index shaft 13 at least substantially about a 90 degree bend, and is subsequently directed into an energy chain 18 of the injection-moulding machine 1 rolling around the rotation axis of the index shaft 13.

Figure 3:
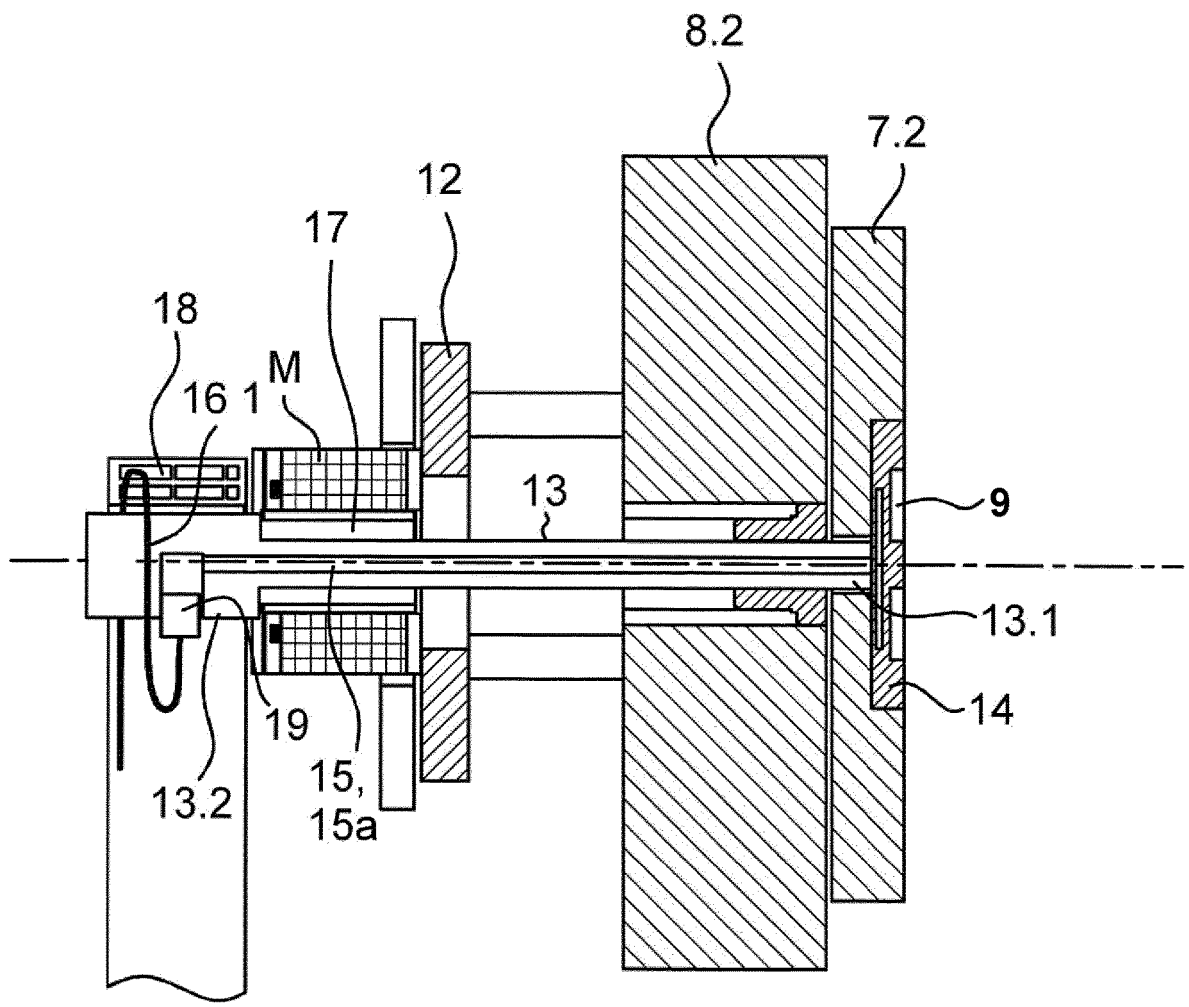

FIG. 3 shows the fluid feed line 16.1, as it is connected to the index shaft 13 in a manner leading away radially at an end portion 13.2 of the index shaft 13 facing away from the index plate 14, and is directed laterally to the index shaft 13 into an energy chain 18 of the injection-moulding machine 1 rolling around the rotation axis of the index shaft.

Figure 4:
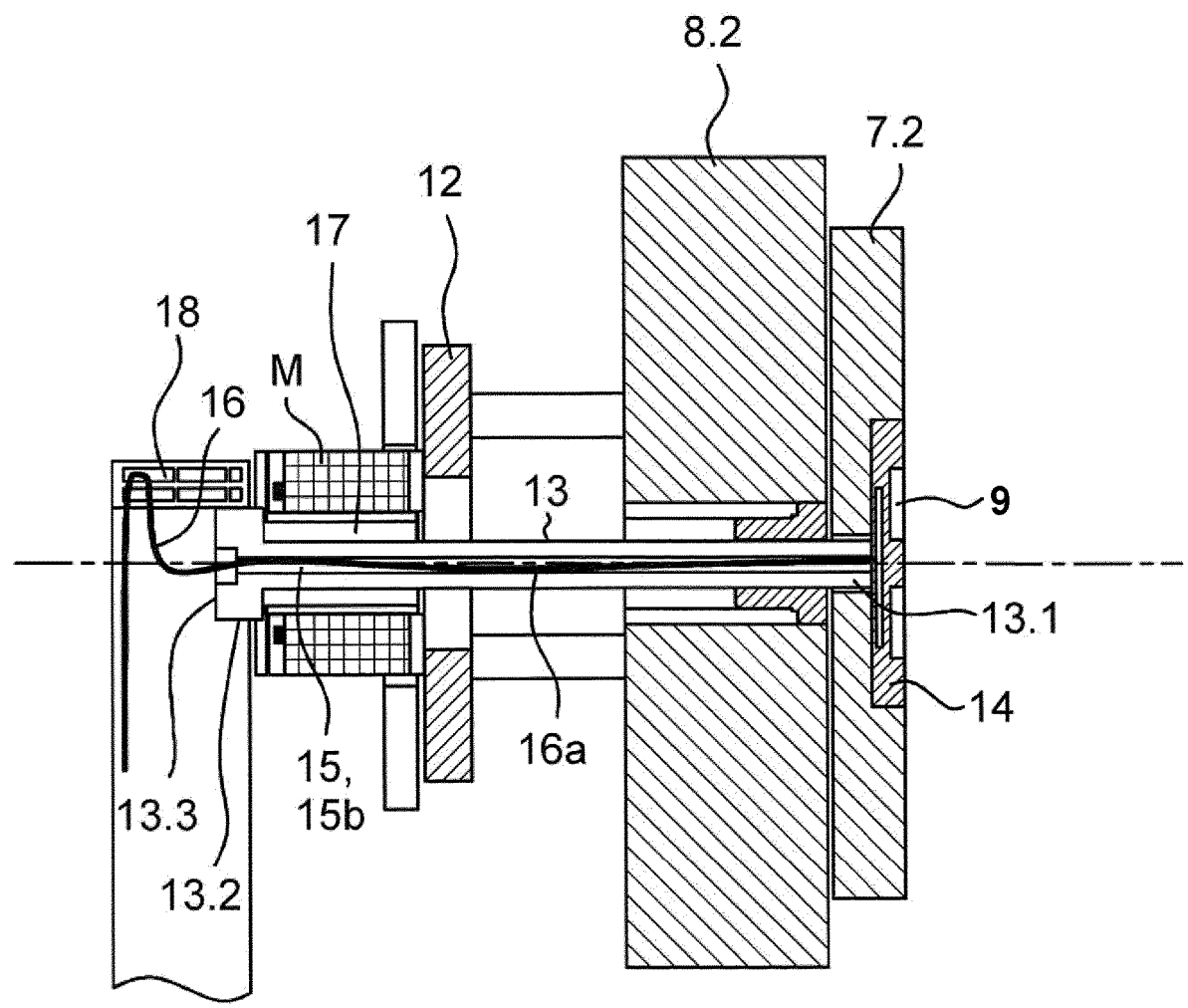
Figure 5:
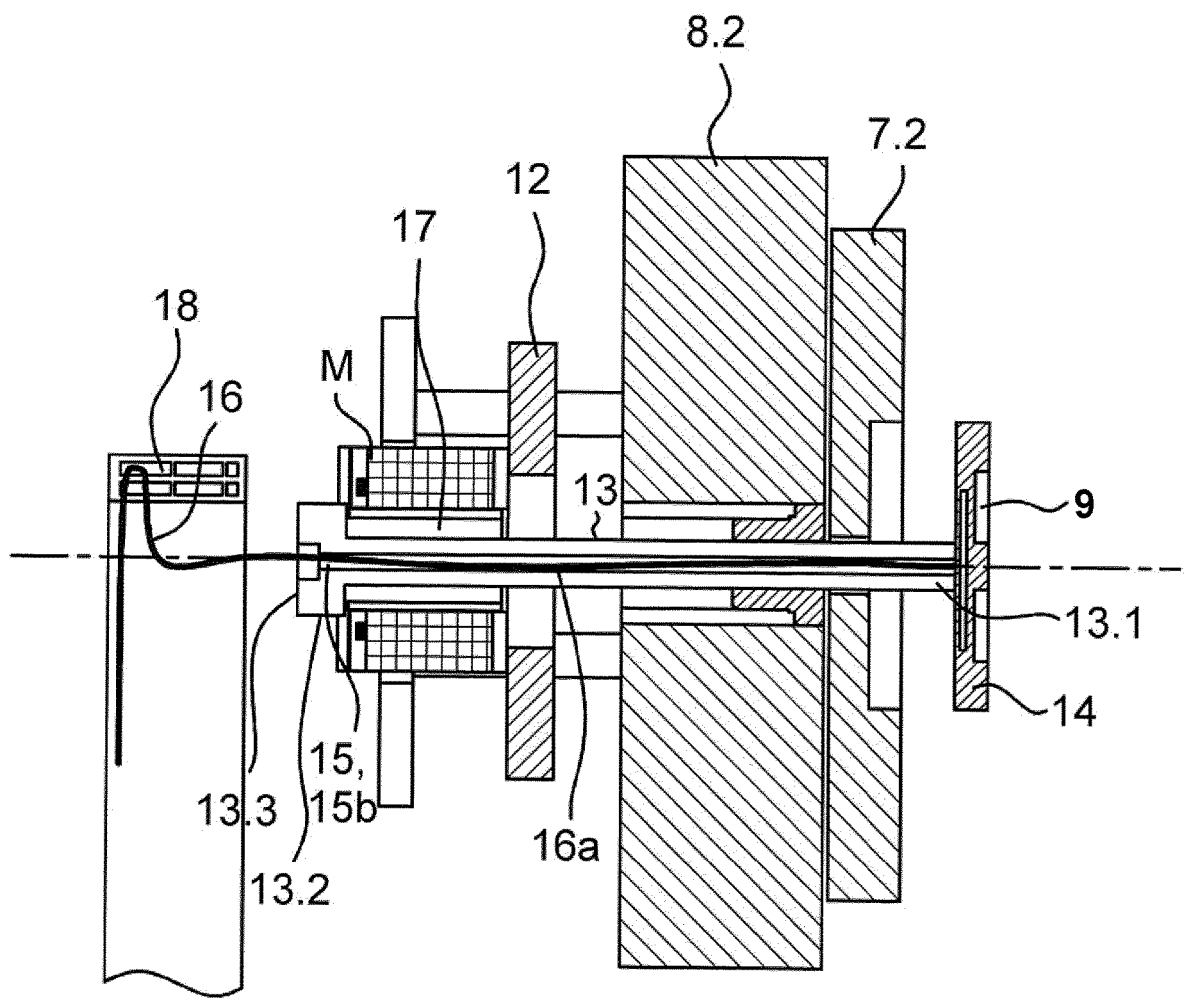

In FIG. 4 and FIG. 5 in a modification to FIG. 2 and FIG. 3, the channel 15 is configured as a tunnel 15*b* in which a fluid line 16 or a portion of a fluid line 16*a* is laid, wherein the fluid is conveyed within the fluid line 16 and the portion of the fluid line 16*a* between an end portion 13.2 of the index shaft 13, facing away from the index plate 14, and the end portion 13.1 of the index shaft 13, protruding into the injection mould 7.

The exemplary injection-moulding machine 1 shown in FIG. 4 and FIG. 5 therefore has a first platen 8.1, which is configured for carrying the first mould half 7.1 of the injection mould 7, and has a second platen 8.2, which is configured for carrying the second mould half 7.2 of the injection mould 7, in such a way that in a closed state of the injection mould 7 the first mould half 7.1 and the second mould half 7.2 delimit at least one cavity 9 of the injection mould 7.

The injection-moulding machine 1 has in addition the index shaft 13, mounted rotatably and axially adjustably outside the injection mould 7, which index shaft is rotationally driven by means of a motor M of the injection-moulding machine 1 arranged outside the injection mould 7.

The index shaft 13 has an end portion 13.1 protruding into the injection mould 7 in the installed position of the injection mould 7 in the injection-moulding machine 1, which end portion is configured for fastening on the index shaft 13 an index plate 14 to be arranged within the injection mould 7. The index shaft 13 has at least one channel 15, in which at least one fluid line 16 runs. The channel 15 is configured to feed a fluid to the index plate 14 from outside, or to discharge it from the interior of the index plate 14. The index plate 14 is automatically adjustable between a first plate position, as is shown for example in FIG. 4, and at least one second plate position, as is shown for example in FIG. 5, by means of the index shaft 13, driven by the motor M, wherein the motor M has a hollow motor shaft 17, through which the fluid line 16 and therefore also the index shaft 13 is passed.

In the case of the present example embodiment, the motor M is configured as a gearless torque motor.

The motor M and the index shaft 13 are arranged on the injection-moulding machine 1 in such a way that the central axis of the hollow motor shaft 17 and the central axis of the index shaft 13 lie on a common rotation axis. In the case of the present example embodiments, the hollow motor shaft 17 extends coaxially to the index shaft 13 and the index shaft 13 is directed out from an end of the hollow motor shaft 17 facing away from the index plate 14.

In the case of the variant embodiment according to FIG. 4 and FIG. 5, the fluid line 16 which is passed through the channel 15 of the index shaft 13, is directed axially out from the channel 15 of the index shaft 13 at a front end 13.3 of the index shaft 13 facing away from the index plate 14, and outside the index shaft 13 is directed away from the rotation axis of the index shaft 13 at least substantially about a 90 degree bend, and is subsequently introduced into an energy chain 18 of the injection-moulding machine 1 rolling around the rotation axis of the index shaft 13.

Figure 6:
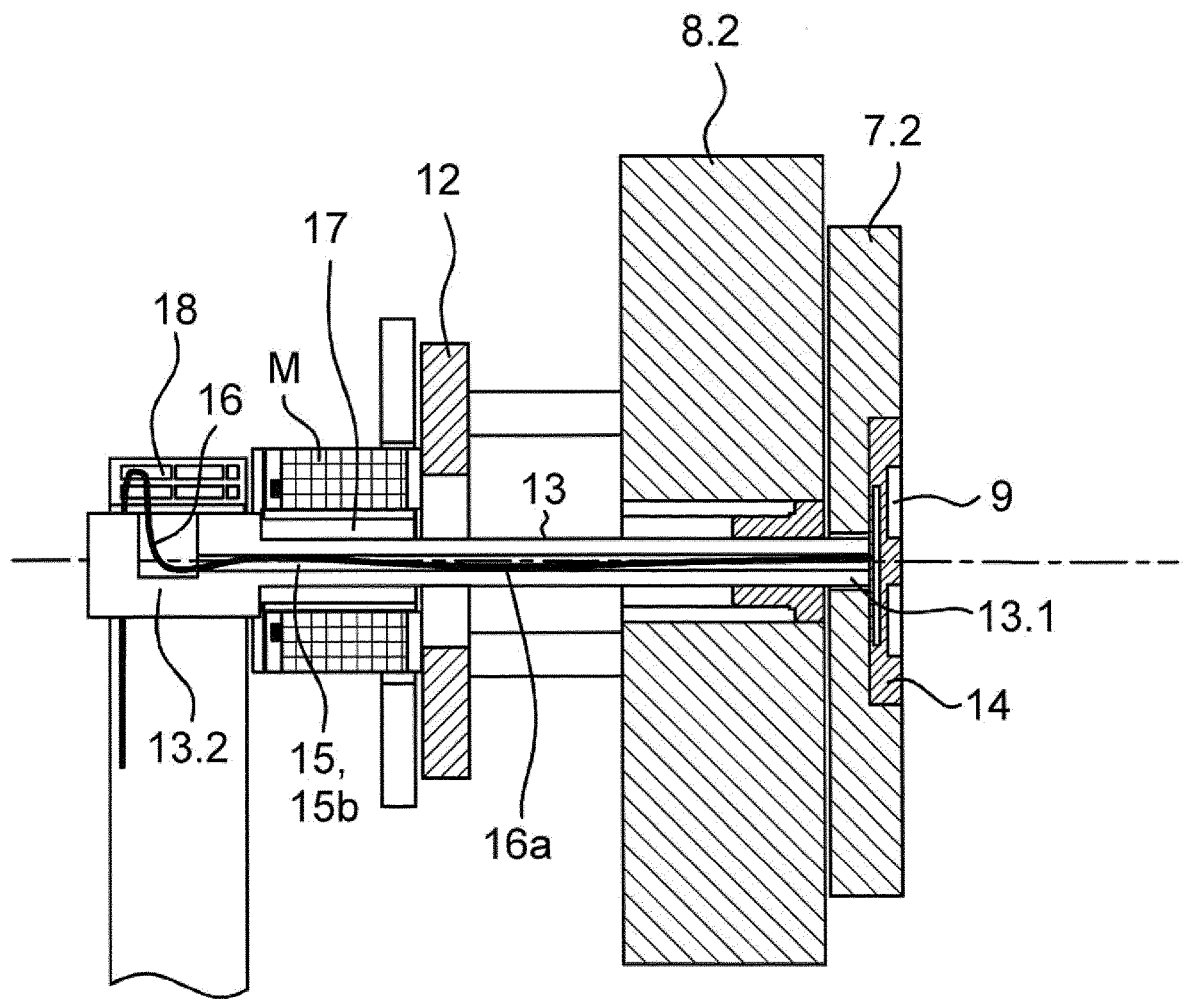

In the case of the variant embodiment according to FIG. 6, the fluid line 16 which is passed through the channel 15 of the index shaft 13 is directed radially out from the channel 15 of the index shaft 13 at an end portion 13.2 of the index shaft 13 facing away from the index plate 14, and is introduced laterally to the index shaft 13 into an energy chain 18 of the injection-moulding machine 1 rolling around the rotation axis of the index shaft 13.

According to the illustrated example embodiments, the injection-moulding machine 1 generally also has an adjustably mounted ejector plate 12, which in the case of the example embodiments which are shown is arranged on a rear side of the first platen 8.1 facing away from the injection mould 7, and which in turn has a rear side facing away from the injection mould 7, on which rear side both the motor M is fastened with its motor housing, and also the index shaft 13 is mounted rotatably by the motor M and immovably relative to the ejector plate 12 in axial direction.

The hollow motor shaft 17 can have an inner profile and the index shaft 13 can have an outer profile here, wherein the inner profile of the hollow motor shaft 17 and the outer profile of the index shaft 13 are coordinated with one another in such a way that the hollow motor shaft 17 is coupled with the index shaft 13 in a torque-proof manner. Alternatively, however, the hollow motor shaft 17 can be coupled with the index shaft 13 by means of different shaft-hub connections, thus for example with clamping elements known per se, carrier elements, such as feather keys and fitting grooves, and flange couplings, clamp couplings or clamping sleeves.

In the case of the present example embodiments, the fluid line 16 is configured as a hose line extending in one piece through the hollow motor shaft 17 of the motor M and the channel 15 of the index shaft 13 up to the index plate 14.

LIST OF REFERENCE NUMBERS

1 plastic injection-moulding machine
2 machine frame
3 injection unit
4 clamping unit
5 extruder 6 feed hopper
7 injection mould
7.1 first mould half
7.2 second mould half
8.1 first platen
8.2 second platen
9 cavity
10 machine control
11 user interface device
12 ejector plate
13 index shaft
13.1, 13.2 end portion
13.3 front end
14 index plate
15 channel
15a flow channel
15b tunnel
16 fluid line
16a portion of a fluid line
16.1 fluid feed line
17 hollow motor shaft
18 energy chain
19 connection piece
M motor

What is claimed is:

1. An injection-moulding machine, having a first platen (8.1), which is designed for carrying a first mould half (7.1) of an injection mould (7), a second platen (8.2), which is designed for carrying a second mould half (7.2) of the injection mould (7) in such a way that in a closed state of the injection mould (7) the first mould half (7.1) and the second mould half (7.2) delimit at least one cavity (9) of the injection mould (7), and having an index shaft (13), which is mounted rotatably and axially adjustably on the injection-moulding machine (1) outside the injection mould (7), is rotationally driven by means of a motor (M) of the injection-moulding machine (1) arranged outside the injection mould (7) and has an end portion (13.1) which protrudes into the injection mould (7) in the installed position of the injection mould (7) in the injection-moulding machine (1), is designed for fastening on the index shaft (13) an index plate (14) to be arranged within the injection mould (7) and has at least one continuous channel (15) extending directly between the end portion and an opposing end portion of the index shaft adjacent to the motor, wherein said at least one continuous channel is configured to feed a fluid to the index plate (14) or to remove a fluid from the index plate (14), wherein by means of the index shaft (13), driven by the motor (M), the index plate (14) is automatically adjustable between a first plate position of the index plate (14) and at least one second plate position of the index plate (14), and wherein the motor (M) has a hollow motor shaft (17), through which the fluid is passed.

2. The injection-moulding machine according to claim 1, wherein the motor (M) is configured as a gearless torque motor.

3. The injection-moulding machine according to claim 1, wherein the motor (M) and the index shaft (13) are arranged on the injection-moulding machine (1) in such a way that the central axis of the hollow motor shaft (17) and the central axis of the index shaft (13) lie on a common rotation axis.

4. The injection-moulding machine according to claim 3, wherein the hollow motor shaft (17) extends coaxially to the index shaft (13), and the index shaft (13) is directed out from an end of the hollow motor shaft (17) facing away from the index plate (14).

5. The injection-moulding machine according to one of claim 1, wherein the at least one continuous channel (15) is configured as a flow channel (15a), in which the fluid is conveyed between an end portion (13.2) of the index shaft (13) facing away from the index plate (14) and the end portion (13.1) of the index shaft (13) protruding into the injection mould (7).

6. The injection-moulding machine according to claim 5, wherein the index shaft (13) has, at its end portion (13.2) facing away from the index plate (14), a connection piece (19), which is fluidically connected with the flow channel (15a) and to which a fluid feed line (16.1) is connected.

7. The injection-moulding machine according to claim 6, wherein at an end portion (13.2) of the index shaft (13), facing away from the index plate (14), the fluid feed line (16.1) is connected to the index shaft (13) in a manner leading radially away, and laterally to the index shaft (13) is directed into an energy chain (18) of the injection-moulding machine (1) rolling around the rotation axis of the index shaft, or the fluid line (16), passed through the at least one continuous channel (15) of the index shaft (13), or the portion of the fluid line (16a) at an end portion (13.2) of the index shaft (13), facing away from the index plate (14), is directed radially out from the at least one continuous channel (15) of the index shaft (13) and laterally to the index shaft (13) is directed into an energy chain (18) of the injection-moulding machine (1) rolling around the rotation axis of the index shaft.

8. The injection-moulding machine according to claim 1, wherein the at least one continuous channel (15) is configured as a tunnel (15a) in which a fluid line (16) or a portion of a fluid line (16a) is laid, wherein the fluid within the fluid line (16) or the portion of the fluid line (16a) is conveyed between an end portion (13.2) of the index shaft (13), facing away from the index plate (14), and the end portion (13.1) of the index shaft (13) protruding into the injection mould (7).

9. The injection-moulding machine according to claim 1, wherein a fluid feed line (16.1) is connected axially to the index shaft (13) at a front end (13.3) of the index shaft (13) facing away from the index plate (14), and outside the index shaft (13) is directed away from the rotation axis of the index shaft (13) at least substantially about a 90 degree bend, and subsequently is introduced into an energy chain (18) of the injection-moulding machine (1) rolling around the rotation axis of the index shaft (13), or the fluid line (16), passed through the at least one continuous channel (15) of the index shaft (13), or the portion of the fluid line (16a) at a front end (13.3) of the index shaft (13) facing away from the index plate (14) is directed out from the at least one continuous channel (15) of the index shaft (13) and outside the index shaft (13) is directed away from the rotation axis of the index shaft (13) at least substantially about a 90 degree bend, and subsequently is introduced into an energy chain (18) of the injection-moulding machine (1) rolling around the rotation axis of the index shaft (13).

10. The injection-moulding machine according to claim 1, wherein the injection-moulding machine (1) has an adjustably mounted ejector plate (12) which is arranged on a rear side of the first platen (8.1) or of the second platen (8.2) facing away from the injection mould (7), and which in turn has a rear side facing away from the injection mould (7), on which rear side both the motor (M) with its motor housing is fastened, and also the index shaft (13) is mounted rotatably by the motor (M) and immovably relative to the ejector plate (12) in axial direction.

11. The injection-moulding machine according to claim 1, wherein the hollow motor shaft (17) has an inner profile and the index shaft (13) has an outer profile, wherein the inner profile of the hollow motor shaft (17) and the outer profile of the index shaft (13) are coordinated with one another in such a way that the hollow motor shaft (17) is coupled with the index shaft (13) in a torque-proof manner.

12. The injection-moulding machine according to claim 11, wherein the index shaft (13) is directed displaceably in an axial direction relative to the hollow motor shaft (17).

* * * * *